United States Patent
Graf et al.

(10) Patent No.: US 8,482,393 B2
(45) Date of Patent: Jul. 9, 2013

(54) TRANSMISSIONS FOR VEHICLES

(75) Inventors: Alexander Graf, Friedrichshafen (DE);
Rolf Schmitz, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 377 days.

(21) Appl. No.: 12/825,574

(22) Filed: Jun. 29, 2010

(65) Prior Publication Data
US 2011/0006889 A1 Jan. 13, 2011

(30) Foreign Application Priority Data
Jul. 9, 2009 (DE) .......... 10 2009 027 562

(51) Int. Cl.
*B60C 23/00* (2006.01)

(52) U.S. Cl.
USPC ........... 340/438; 340/446; 340/447; 340/449; 477/10; 477/15; 477/72; 701/51; 701/53; 701/54

(58) Field of Classification Search
USPC ... 340/438, 446–449; 477/10, 15, 72; 701/51, 701/53, 54
See application file for complete search history.

(56) References Cited

U.S. PATENT DOCUMENTS

| 5,749,060 | A * | 5/1998 | Graf et al. | 340/439 |
| 2006/0259215 | A1* | 11/2006 | Lin | 701/29 |
| 2007/0017986 | A1* | 1/2007 | Carrender et al. | 235/435 |
| 2007/0298927 | A1 | 12/2007 | Hansson | |
| 2009/0058599 | A1* | 3/2009 | Calvarese | 340/10.1 |
| 2009/0121840 | A1* | 5/2009 | Bauchot et al. | 340/10.1 |

FOREIGN PATENT DOCUMENTS

| DE | 43 34 595 C1 | 4/1995 |
| DE | 103 26 676 A1 | 3/2004 |
| EP | 1 873 032 A1 | 1/2008 |

\* cited by examiner

*Primary Examiner* — Tai T Nguyen
*Assistant Examiner* — Ojiako Nwugo
(74) *Attorney, Agent, or Firm* — Davis & Bujold, PLLC

(57) ABSTRACT

A motor vehicle transmission with at least one sensor (15), associated with the motor vehicle transmission, for picking up measurement signals at the motor vehicle transmission and transmitting them by a wireless unit to a transmission control unit (12) of the motor vehicle transmission. In each case, an RFID-responder (16) is associated with each sensor (15), which transmits the respective measurement signals concerned to an RFID-reader (17), associated with the transmission control unit (12). The RFID-reader (17) transmits wirelessly to the RFID-responder (16), associated with the sensor (15) concerned, electrical energy for operating the sensor (15) and for operating the RFID-responder (16) associated with the sensor (15).

14 Claims, 5 Drawing Sheets

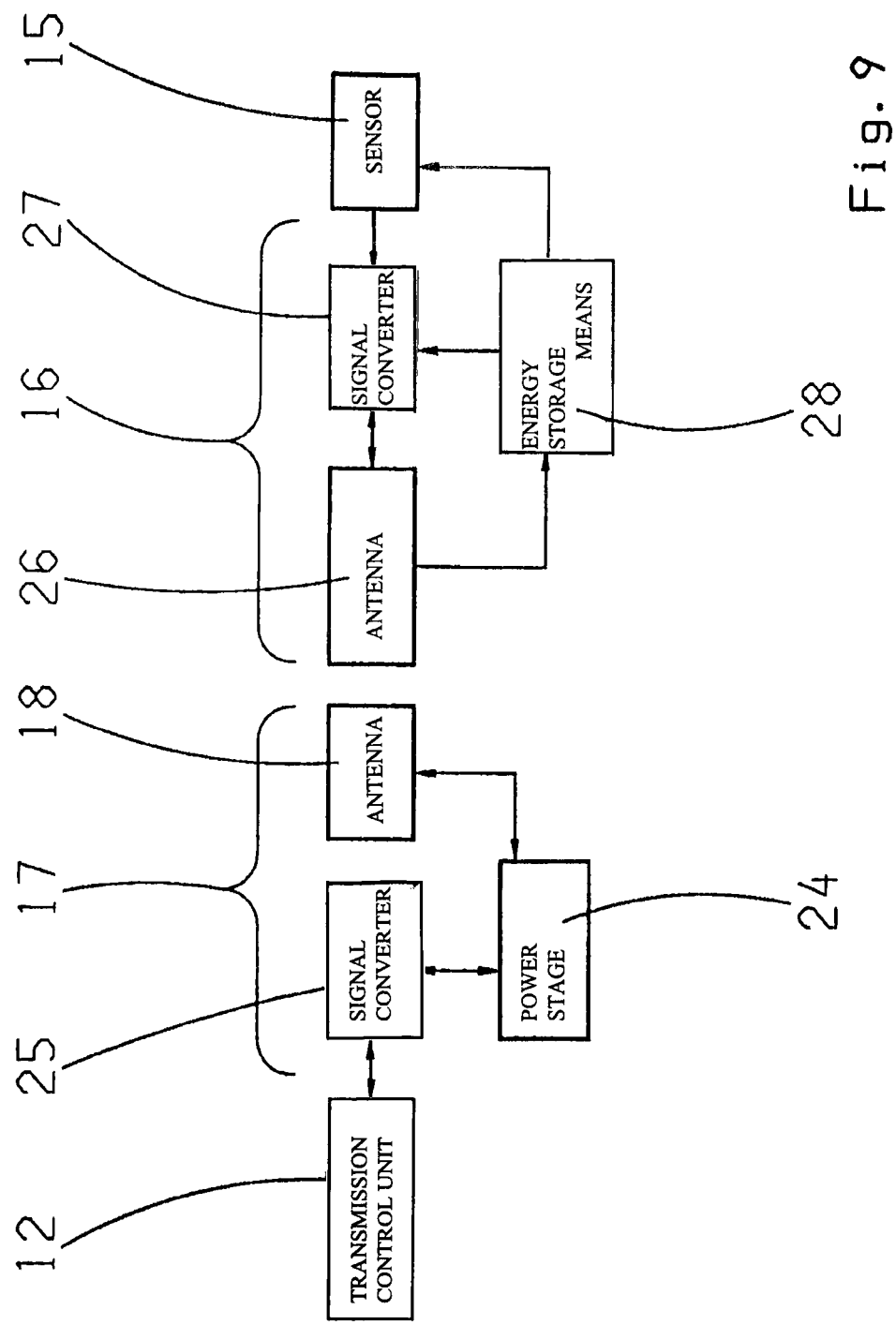

TRANSMISSIONS FOR VEHICLES

This application claims priority from German patent application serial no. 10 2009 027 562.2 filed Jul. 9, 2009.

FIELD OF THE INVENTION

The invention concerns a transmission for motor vehicles.

BACKGROUND OF THE INVENTION

In automotive technology sensors and actuators are typically connected by wire to a control unit, in order to ensure both the transmission by wire of data signals and the supply of energy.

In transmission applications, however, it is not always possible to arrange all the sensors and actuators spatially in such manner that a wire connection or cable path is possible in the transmission between a control unit and the sensors or actuators. Moreover, the susceptibility of cable-plug connections to fail due to temperature fluctuations, vibrations, or chemical reactions caused by environmental influences is problematic with regard to wire connections or cable connections between a control unit and sensors and actuators.

From DE 43 34 595 C1 a motor vehicle transmission with a transmission control unit is known, such that sensors built into the transmission transmit sensor signals to the transmission control unit by wireless means. In this case the sensors transmit their sensor data to the transmission control unit with the help of transponders.

From DE 103 26 676 A1 a control unit, for example a transmission control unit is known, in which sensors transmit sensor signals by wireless means to a control device and in which energy is supplied to the sensor and/or actuator other then from a battery.

Although it is fundamentally already known that sensors built into a transmission can transmit sensor signals to a transmission control unit by wireless means, there is still need for a motor vehicle transmission in which signal transfer and energy supply can be achieved with high reliability and little complexity.

SUMMARY OF THE INVENTION

Starting from there the purpose of the present invention is to provide a new type of motor vehicle transmission. According to the invention, an RFID-responder (transponder) is associated with the or each sensor, which wirelessly transmits the respective measurement signals to an RFID-reader associated with the transmission control unit, and the RFID-reader wirelessly transmits electrical energy for operating the sensor concerned and for operating the RFID-responder associated with the sensor, to the sensor-associated RFID-responder.

In the motor vehicle transmission according to the invention, sensors built into the transmission are wirelessly coupled with the help of RFID technology, to a transmission control unit. A respective RFID-responder is associated with the, or with each sensor, which transmits the measurement signals of the sensor to the transmission control unit, namely to an RFID-reader associated with the transmission control unit. By means of the RFID-reader, electrical energy for operating the sensor concerned and for operating the RFID-responder associated with the sensor can be transmitted wirelessly.

According to an advantageous further development of the present invention, actuators are also coupled to the transmission control unit with the help of RFID technology, namely with the help of RFID-responders associated with the actuators and with the help of the RFID-reader associated with the transmission control unit.

BRIEF DESCRIPTION OF THE DRAWINGS

Example embodiments of the invention, to which it is not limited, are explained in greater detail with reference to the drawings, which show:

FIG. 9: Block circuit diagram to clarify the mode of operation of a motor vehicle transmission according to the invention.

DETAILED DESCRIPTION OF THE PREFERRED EMBODIMENTS

The invention concerns a motor vehicle transmission. A motor vehicle transmission is generally divided into two units or modules, namely a mechanical module, which serves to transmit and convert forces or torques, and an electronic module which serves to control the mechanical module. The electronic module of a motor vehicle transmission is also called the transmission control unit.

Figure 1:
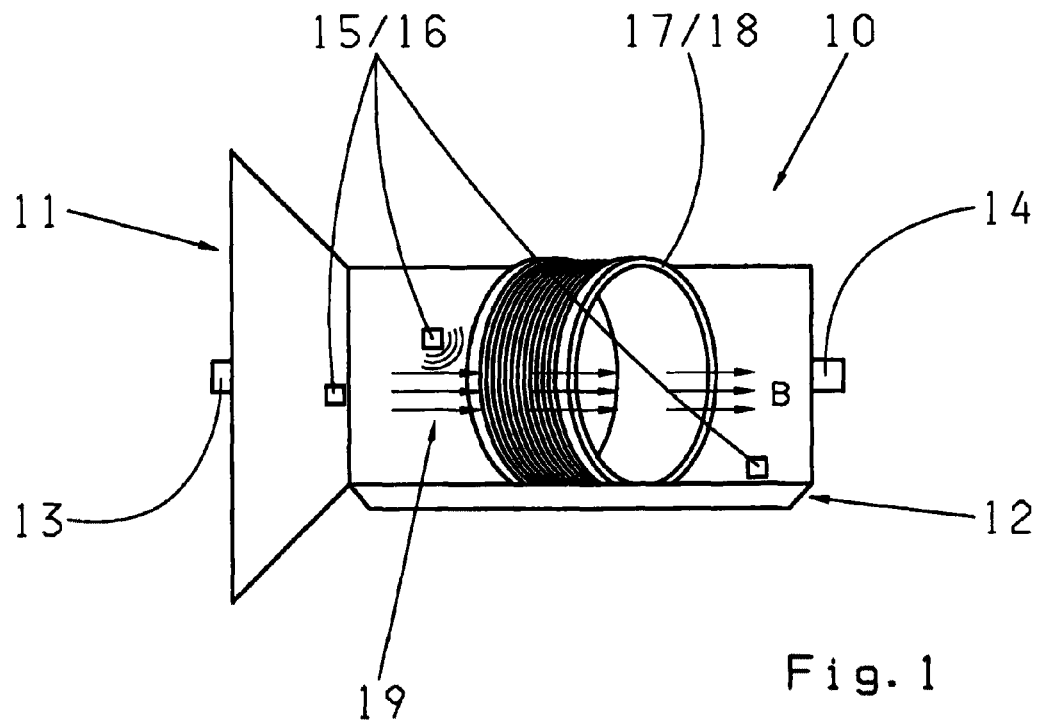
FIG. 1: Schematic representation of a first example embodiment of a motor vehicle transmission according to the invention.

FIG. 1 is a very schematic representation of a motor vehicle transmission 10 according to the invention and which shows a mechanical module 11 and an electronic module 12 of the motor vehicle transmission 10. The mechanical module 11 comprises a transmission input 13, a transmission output 14, and shifting elements that are arranged between the transmission input 13 and the transmission output 14 of the mechanical module 11 to facilitate connection thereof and which are typically in the form of clutches and brakes, and together with a plurality of transmission ratio steps, convert speeds and torques applied at the transmission input 13 and transmit them at the transmission output 14 and thus to a drive output of a motor vehicle. The electronic module 12 of the motor vehicle transmission 10 is designed as a transmission control unit and serves to control or regulate the transmission 10 of the motor vehicle.

In the example embodiment shown in FIG. 1 a plurality of sensors 15 are associated with the mechanical module 11 of the motor vehicle transmission 10. The sensors 15 serve to detect measurement values and transmit corresponding measurement signals by wireless means to the transmission control unit 12.

In the context of the present invention each sensor 15 is associated with a respective RFID-responder 16 and an associated antenna (not shown in detail), such that the RFID-responder 16 can transmit the measurement signals of the sensor 15 wirelessly to the transmission control unit 12, namely to an RFID-reader 17 associated with the transmission control unit 12 or which co-operates with the latter. FIG. 1 shows an antenna 18 of the RFID-reader 17 associated with the transmission control unit 12.

As already mentioned, the RFID-responder 16 belonging to each sensor 15 transmits measurement signals from the sensor 15 concerned to the RFID-reader 17 that co-operates with the transmission control unit 12.

The RFID-reader 17 does not only serve to receive the wirelessly-transmitted measurement signals from the sensor 15, but rather, the RFID-reader 17 or more specifically its antenna 18 transmits electrical energy in the form of a magnetic field 19, the energy transmitted by the RFID-reader 17 to the RFID-responder 16 being needed on the one hand for operating the sensor 15 concerned and on the other hand for operating the RFID-responder 16 associated with the sensor. Thus, the transmission of the measurement signals from the sensors 15 and the transmission of electrical energy takes place with the help of RFID technology, in each case wirelessly.

Preferably, the sensors 15 and the RFID-responders 16 respectively associated with each sensor 15 are formed as monolithic units. This means that the sensors 15 and the RFID-responders 16 in each case form an inseparable unit, which can be integrated in the mechanical module 11 of the motor vehicle transmission 10 simply and in a particularly space-saving manner.

In the example embodiment shown in FIG. 1 the antenna 18 of the RFID-reader 17 that co-operates with the transmission control unit 12 is formed by a coil such that, as shown in FIG. 1, the coil and thus the antenna 18 is associated with a housing wall of the mechanical module 11 of the motor vehicle transmission 10 in such manner that the coil or antenna 18 delimits an inside space of the motor vehicle transmission 10, namely an inside space of the mechanical module 11 thereof in which the shifting elements and gears of the motor vehicle transmission 10 are arranged.

The antenna 18 made as a coil then generates a magnetic field 19 which, as shown in FIG. 1, extends parallel to a transmission axis of the mechanical module 11 of the motor vehicle transmission 10 according to the invention.

Figure 2:
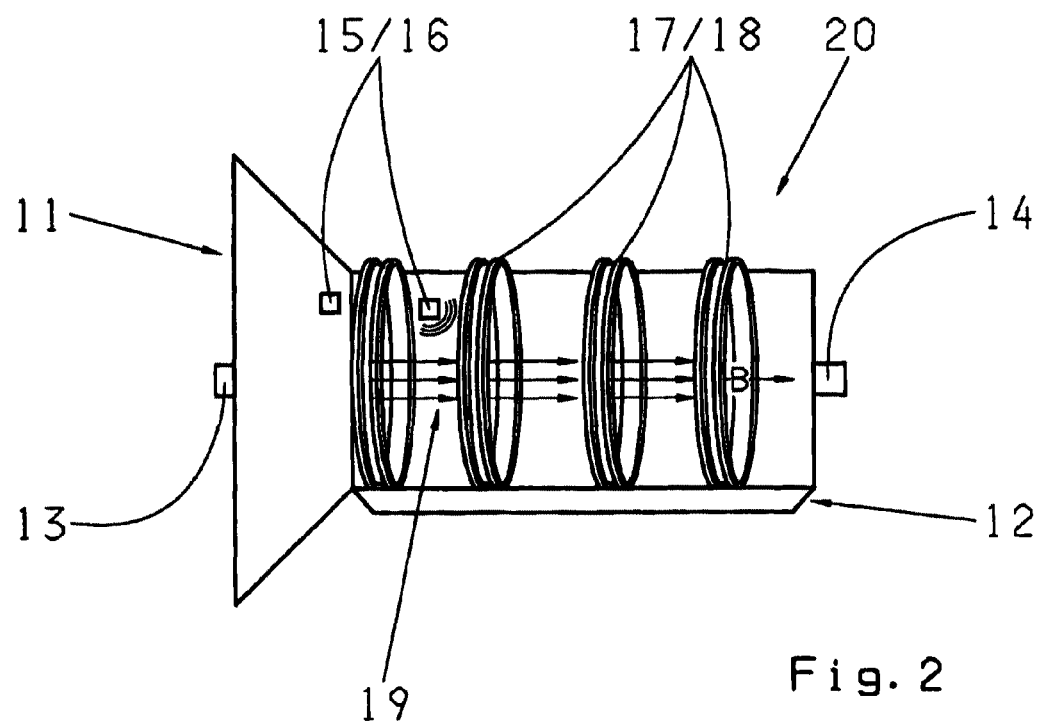
FIG. 2: Schematic representation of a second example embodiment of a motor vehicle transmission according to the invention.

FIG. 2 shows an example embodiment of a motor vehicle transmission 20 according to the invention which differs from the example embodiment of FIG. 1 only in that the antenna 18 of the RFID-reader 17, which co-operates with the transmission control unit 12, is formed by a plurality of coils connected in series. Compared with the variant in FIG. 1 this has the advantage that a still more homogeneous distribution of the magnetic field 19 can be produced in the inside space of the mechanical module 11 defined by the housing wall thereof.

The common feature of the example embodiments shown in FIGS. 1 and 2 is that the coil, or each of the coils of which the antenna 18 of the RFID-reader 17 that co-operates with the transmission control unit 12 consists, is associated with the mechanical module 11 of the motor vehicle transmission in such a manner that the inside space of the mechanical module 11 is enclosed concentrically at least in part, by the coil, or by each of the coils and thus by the antenna 18, so that the respective magnetic field 19 extends in each case parallel to the transmission axis of the motor vehicle transmission.

Figure 3:
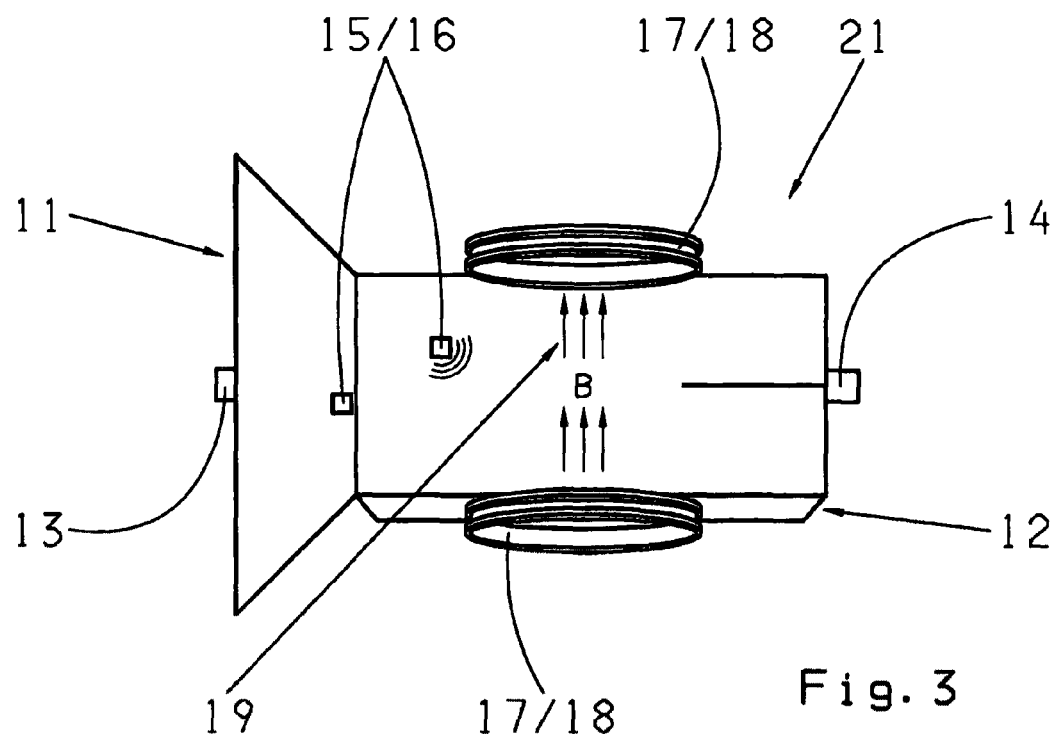
FIG. 3: Schematic representation of a third example embodiment of a motor vehicle transmission according to the invention.

FIG. 3 shows a variant of a motor vehicle transmission 21 in which the coils forming the antenna 18 of the RFID-reader 17 are associated with the housing wall of the mechanical module 11 of the motor vehicle transmission 21 in such manner that they delimit the housing wall of the mechanical module 11 in sections and produce a magnetic field 19 which extends perpendicularly to a transmission axis of the transmission 21 of the motor vehicle.

In the variants shown in FIGS. 1 to 3 a uniform and homogenous distribution of the magnetic moment 19 produced can be ensured over the entire inside space of the mechanical module 11 of the motor vehicle transmission.

Accordingly, good and reliable reception of the measurement signals sent out by the RFID-responders 16 of the respective sensors 15, and on the other hand a sufficient energy supply to the RFID-responders 16 or sensors 15, can be achieved.

Preferably, the coils or antennae 18 of the RFID-readers 17 of the motor vehicle transmissions shown in FIGS. 1 to 3 consist of printed-circuit or flexo-foil coils. By means of flexo-foil coils particularly simple and advantageous assembly and thus integration of the antenna 18 of the RFID-reader 17 in the motor vehicle transmission can be achieved, and this by a simple adhesion process.

Figure 4:
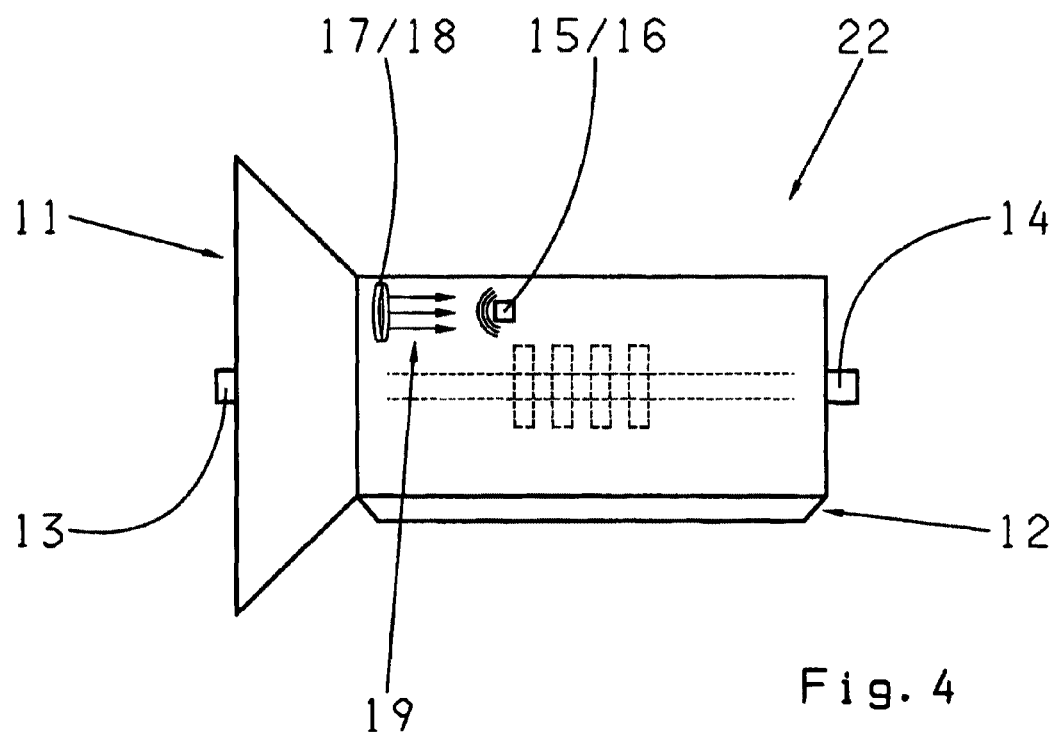
FIG. 4: Schematic representation of a fourth example embodiment of a motor vehicle transmission according to the invention.

FIG. 4 shows a variant of a motor vehicle transmission 22 according to the invention, in which the RFID-reader 17 and its antenna 18 have smaller dimensions. This embodiment variant is advantageous when only a locally restricted magnetic field 19 is needed. In this case, by virtue of the smaller size of the RFID-reader 17 or its antenna 18 more flexible integration in restricted structural spaces in the motor vehicle transmission 22 is possible.

The common feature of the variants in FIGS. 1 to 4 is the antennae 18 of the RFID-readers 17 that co-operate or are associated with the transmission control unit 12 consist of coils associated with the housing of the mechanical module 11 of the motor vehicle transmission, or are integrated in the inside space of the mechanical module 11 delimited by the housing. These antennae 18 are then in electrically conducting connection with the transmission control unit 12.

In contrast, FIGS. 5 to 8 show embodiment variants of the invention in which the antennae 18 of the RFID-readers 17 are integrated in the electronic module or the transmission control unit 12.

Figure 5:
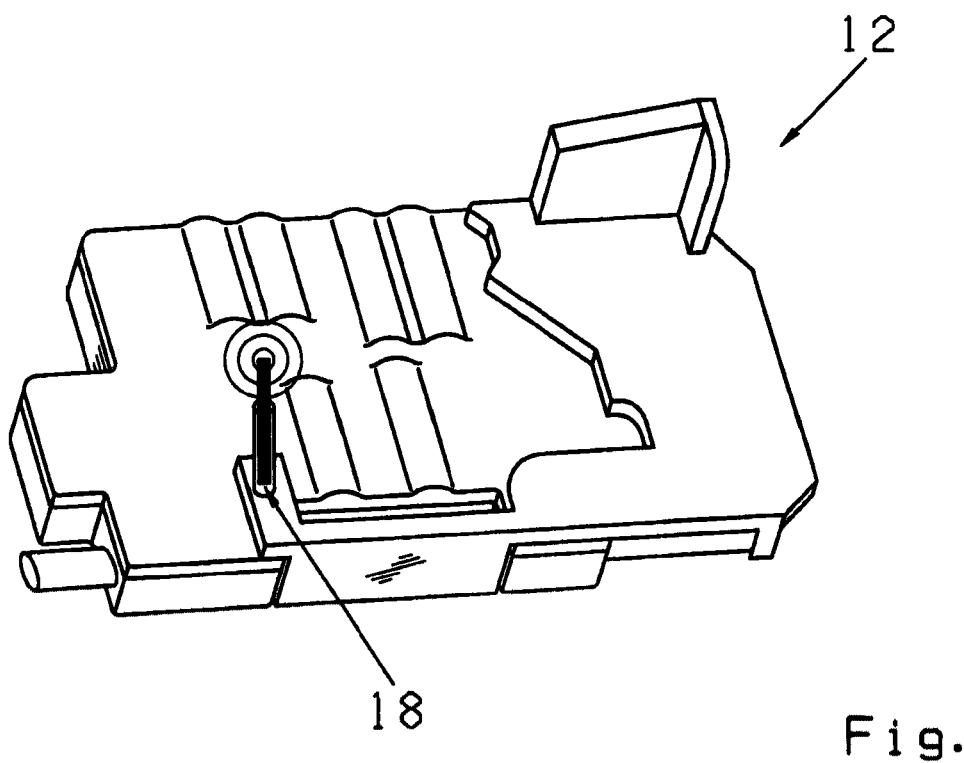
FIG. 5: Detail of a fifth example embodiment of a motor vehicle transmission according to the invention, shown schematically.
Figure 6:
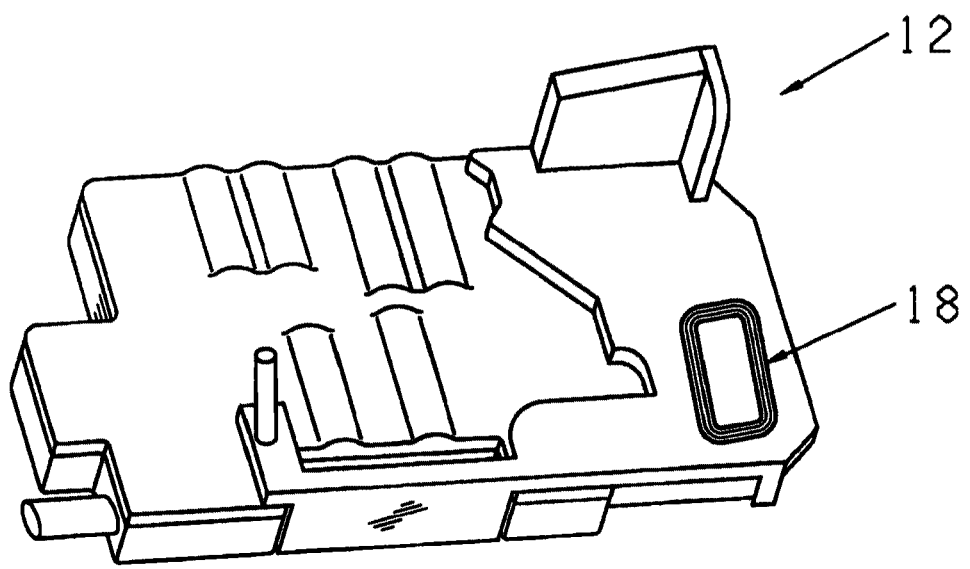
FIG. 6: Detail of a sixth example embodiment of a motor vehicle transmission according to the invention, shown schematically.
Figure 7:
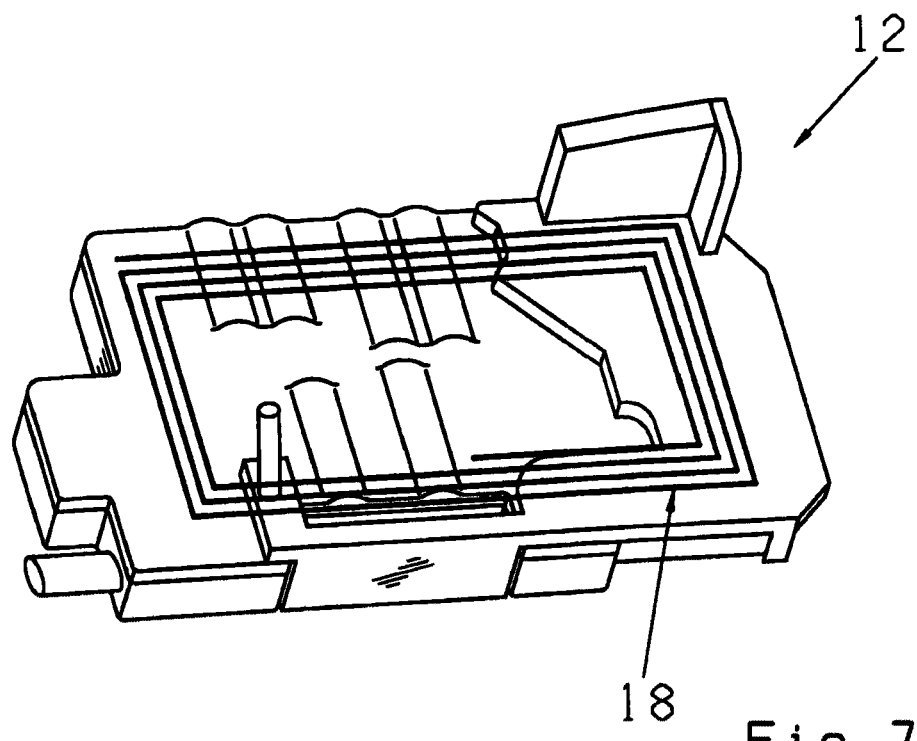
FIG. 7: Detail of a seventh example embodiment of a motor vehicle transmission according to the invention, shown schematically.
Figure 8:
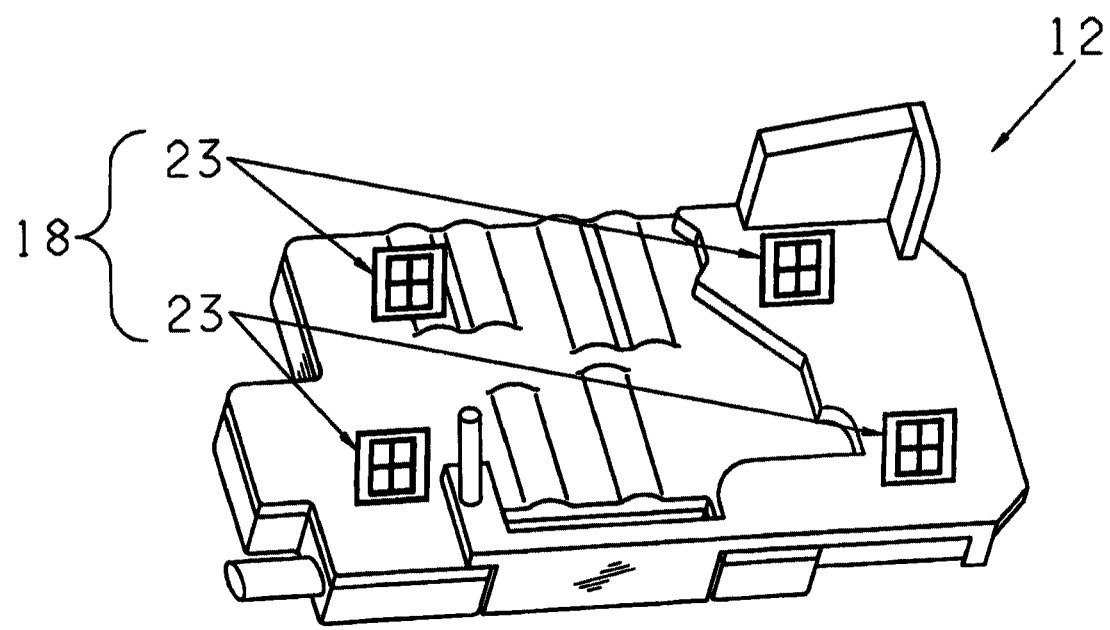
FIG. 8: Detail of an eighth example embodiment of a motor vehicle transmission according to the invention, shown schematically.

Thus, FIGS. 5 to 8 show in each case a section of a transmission control unit 12 in which the antenna 18 of the RFID-reader 17 is integrated, the antenna 18 in FIG. 5 being in the form of a rod antenna, the antenna 18 in FIG. 6 being a frame antenna, the antenna 18 in FIG. 7 being a flexo-foil, and the antenna 18 in FIG. 8 being in the form of an array of patch antennae 23.

When, as shown in the example embodiments of FIGS. 5 to 8, the antenna 18 of the RFID-reader 17 is integrated directly in the transmission control unit 12, the magnetic field it produces typically suffices only for the supply of energy to sensors whose operation requires a relatively small amount of electrical energy.

When, as shown in the example embodiments of FIGS. 1 to 4, the antenna 18 of RFID-reader 17 is integrated in the mechanical module 11 of the motor vehicle transmission, stronger magnetic fields 19 can be produced so that even sensors whose power uptake is larger can be operated. In such a case it is also possible to operate at least one actuator in the sense of the invention, i.e. to associate at least one actuator with an RFID-responder in order, then, on the one hand to transmit control signals from the transmission control unit 12 wirelessly, and on the other hand to wirelessly supply the actuator with the electrical energy required for its operation. The actuator and the RFID-responder associated with it are then again preferably made as a monolithic unit.

Preferably, the sensors 15 which together with an RFID-responder 16 from a monolithic unit and are integrated in the mechanical module 11 of the motor vehicle transmission, are temperature sensors, for example to detect the temperatures of clutches or brakes in the mechanical module 11 of the motor vehicle transmission and transmit them by wireless means to the transmission control unit 12.

The transmission between the RFID-reader 17 which co-operates with the transmission control unit 12 and the RFID-transponders 16 which co-operate with the sensors 15 and if needs be the actuators, can take place unidirectionally or also bidirectionally.

FIG. 9 shows a block circuit diagram of an RFID-responder 16 associated with a sensor 15 and an RFID-reader 17 associated or co-operating with the transmission control unit 12. As already described, the RFID-reader 17 has an antenna 18 which constitutes a sender and a receiver element, this antenna 18 being controlled by a power stage 24. The power stage 24 co-operates with a signal converter 25 which exchanges data with the transmission control unit 12. The RFID-responder 16 associated with the sensor 15 also has an antenna 26 that constitutes a sender and a receiver element, and the antenna 26 is controlled by a signal converter 27. If necessary the RFID-responder 16 comprises energy storage means 28 in order to store energy transmitted by wireless for the operation of the RFID-responder 16 and the sensor 15.

INDEXES

10 Motor vehicle transmission
11 Mechanical module
12 Electronic module/transmission control unit
13 Transmission input
14 Transmission output
15 Sensor
16 RFID-responder
17 RFID-reader
18 Antenna
19 Magnetic field
20 Motor vehicle transmission
22 Motor vehicle transmission
23 Patch antennae
24 Power stage
25 Signal converter
26 Antenna
27 Signal converter
28 Energy store

The invention claimed is:

1. A motor vehicle transmission with at least one sensor, associated with the motor vehicle transmission, for detecting measurement signals at the motor vehicle transmission and wirelessly transmitting the measurement signals to a transmission control unit of the motor vehicle transmission;
   an RFID-responder (16) being associated with the sensor (15) concerned for transmitting the measurement signals to an RFID-reader (17) associated with the transmission control unit (12); and
   the RFID-reader (17) wirelessly transmitting, to the RFID-responder (16), associated with the sensor (15) concerned, electrical energy for operating the sensor (15) concerned and for operating the RFID-responder (16) associated with the sensor (15) concerned,
   wherein an antenna (18) of the RFID-reader (17), associated with the transmission control unit, is formed by at least one coil, and the at least one coil is supported by an inwardly facing surface of a housing wall of the motor vehicle transmission such that the at least one coil at least partially defines an inside space of the motor vehicle transmission.

2. The motor vehicle transmission according to claim 1, wherein the at least one coil of the antenna (18) of the RFID-reader (17) is orientated so that the at least one coil produces a magnetic field that extends parallel to a longitudinal axis of the transmission.

3. The motor vehicle transmission according to claim 1, wherein the motor vehicle transmission comprises a plurality of coils each of which encloses part of the inside space of the housing defined by the housing wall, and the plurality of coils are connected in series with one another.

4. The motor vehicle transmission according to claim 1, wherein the at least one coil of the antenna (18) of the RFID-reader (17) is orientated such that the at least one coil produces a magnetic field which extends perpendicularly to a longitudinal axis of the transmission.

5. The motor vehicle transmission according to claim 1, wherein the motor vehicle transmission comprises a plurality of coils each of which delimits part of the inside space of the housing defined by the housing wall, and the plurality of coils are connected in series with one another.

6. The motor vehicle transmission according to claim 1, wherein the at least one coil is in the form of one of a printed-circuit coil and a flexi-foil coil.

7. The motor vehicle transmission according to claim 1, wherein an antenna (18) of the RFID-reader (17), associated with the transmission control unit (12), is integrated in the transmission control unit.

8. The motor vehicle transmission according to claim 7, wherein the antenna (18), integrated in the transmission control unit (12) of the RFID-reader, is one of a rod antenna and a frame antenna.

9. The motor vehicle transmission according to claim 7, wherein the antenna (18) of the RFID-reader, integrated in the transmission control unit (12), is a flexi-foil coil.

10. The motor vehicle transmission according to claim 7, wherein the antenna (18) of the RFID-reader, integrated in the transmission control unit (12), is an array of several patch antennae.

11. The motor vehicle transmission according to claim 1, wherein the sensor (15) concerned and the RFID-responder (16) associated therewith together comprise a monolithic unit.

12. A motor vehicle transmission comprising:
   at least one sensor (15) being located within the motor vehicle transmission (10) for sensing at least one measurement signal of the motor vehicle transmission (10);
   at least one RFID-responder (16) being spaced from and electrically connected to the at least one sensor (15) such that each at least one RFID-responder (16) wirelessly transmits the at least one measurement signal to an RFID-reader (17) that is associated with a transmission control unit (12) of the motor vehicle transmission (10); and
   the RFID-reader (17) comprising an antenna (18) for wirelessly transmitting both control signals and electrical energy to the at least one RFID-responder (16) for controlling operation of both the sensor (15) and the RFID-responder (16).

13. The motor vehicle transmission according to claim 12, wherein the sensor (15) and the RFID-responder (16) associated with the sensor (15) comprise a monolithic unit.

14. The motor vehicle transmission according to claim 12, wherein the RFID-responder (16), the sensor (15) concerned, and the RFID-reader (17) are all accommodated by the motor vehicle transmission.

\* \* \* \* \*